United States Patent
Zhang et al.

(10) Patent No.: US 9,574,120 B2
(45) Date of Patent: Feb. 21, 2017

(54) STRUCTURAL ADHESIVE SHEET SPECIFICALLY FOR USE IN A MIRROR BASE OF AN AUTOMOBILE INTERIOR REAR-VIEW MIRROR AND A METHOD FOR PRODUCING THE SAME

(71) Applicant: Zhengzhou Zhongyuan Applied Technology Research and Development Co., Ltd., Zhengzhou, Henan (CN)

(72) Inventors: Deheng Zhang, Henan (CN); Junshi Kong, Henan (CN); Wenli Li, Henan (CN); Huan Wu, Henan (CN); Yajuan Yang, Henan (CN)

(73) Assignee: ZHENGZHOU ZHONGYUAN APPLIED TECHNOLOGY RESEARCH AND DEVELOPMENT CO., LTD., Zhengzhou (CN)

( * ) Notice: Subject to any disclaimer, the term of this patent is extended or adjusted under 35 U.S.C. 154(b) by 179 days.

(21) Appl. No.: 14/357,527

(22) PCT Filed: Nov. 9, 2012

(86) PCT No.: PCT/CN2012/084387
§ 371 (c)(1),
(2) Date: May 9, 2014

(87) PCT Pub. No.: WO2013/067963
PCT Pub. Date: May 16, 2013

(65) Prior Publication Data
US 2014/0323611 A1 Oct. 30, 2014

(30) Foreign Application Priority Data
Nov. 10, 2011 (CN) .......................... 2011 1 0354518

(51) Int. Cl.
| | |
|---|---|
| C09J 147/00 | (2006.01) |
| C09J 109/02 | (2006.01) |
| C09J 163/00 | (2006.01) |
| C08L 9/02 | (2006.01) |
| B29C 47/00 | (2006.01) |

(52) U.S. Cl.
CPC .......... *C09J 147/00* (2013.01); *B29C 47/0066* (2013.01); *C08L 9/02* (2013.01); *C09J 109/02* (2013.01); *C09J 163/00* (2013.01)

(58) Field of Classification Search
CPC ................................ C08L 63/00; C09J 147/00
See application file for complete search history.

(56) References Cited

U.S. PATENT DOCUMENTS

| | | | | |
|---|---|---|---|---|
| 2003/0129384 A1* | 7/2003 | Kalchbrenner | ........ | B41N 10/04 428/317.9 |
| 2004/0127631 A1* | 7/2004 | Kanamori | ............ | C08G 65/336 524/523 |
| 2005/0159511 A1* | 7/2005 | Kramer | .................. | C08G 18/10 523/427 |
| 2006/0199933 A1* | 9/2006 | Okamoto | ................. | C08K 5/09 528/29 |
| 2008/0199118 A1* | 8/2008 | Yabe | .................... | F16C 33/7879 384/448 |
| 2009/0191402 A1* | 7/2009 | Beiermann | ............. | B32B 27/18 428/323 |
| 2010/0041793 A1* | 2/2010 | Pierik | ...................... | C08K 9/08 523/205 |
| 2010/0068518 A1* | 3/2010 | Honma | ................. | B29C 70/086 428/401 |
| 2010/0210745 A1* | 8/2010 | McDaniel | .............. | C09D 5/008 521/55 |
| 2010/0243295 A1* | 9/2010 | Allemand | .............. | B82Y 10/00 174/250 |

(Continued)

FOREIGN PATENT DOCUMENTS

| | | |
|---|---|---|
| CN | 101343514 A | 1/2009 |
| CN | 101402831 | 4/2009 |

(Continued)

OTHER PUBLICATIONS

International Search Report for PCT/CN2012084387, mailed Jan. 31, 2013, 4 pgs.
Arundhati et al., "Thermal and chemical resistance behavior of cured epoxy based on diglycidyl ether of bisphenol-A and thiol treated liquid polysulfide blends", Adv. Ma. Lett. 2010, vol. 1, No. 3, pp. 238-245.
Extended European Search Report for patent application No. 12846942.6 mailed Jun. 9, 2015, 4 pages.
Japan Office Action for patent application No. 2014-540309 mailed Apr. 21, 2016,, 2 pages.
Translation of Japan Office Action for patent application No. 2014-540309 mailed Apr. 21, 2016,, 2 pages.

(Continued)

*Primary Examiner* — Megan McCulley
(74) *Attorney, Agent, or Firm* — Squire Patton Boggs (US) LLP

(57) ABSTRACT

The present invention provides a structural adhesive sheet specifically for use in a mirror base of an automobile interior rear-view mirror and a method for producing the same, said structural adhesive sheet comprises in parts by weight of 20-100 parts of a nitrile-butadiene rubber, 10-70 parts of a partially cured polysulfide adhesive, 5-40 parts of a bisphenol A type epoxy resin, 0.1-2.5 parts of a crosslinking agent, 0.2-2.5 parts of a softening agent, 3-20 parts of a curing agent, 1-10 parts of an accelerator, 20-100 parts of an inorganic filler, and 0.1-3.0 parts of a silane coupling agent. The structural adhesive sheet of the present invention is obtained by subjecting the above-mentioned components to a compounding process and an extrusion film forming process. The advantages of said structural adhesive sheet include good film-forming property, and simple curing process, while having high structural strength, good toughness, and excellent heat-resistance and cold-resistance after cured.

11 Claims, No Drawings

(56) References Cited

U.S. PATENT DOCUMENTS

| | | | | |
|---|---|---|---|---|
| 2010/0272908 | A1* | 10/2010 | Sturgill | C09J 163/00 427/386 |
| 2011/0253668 | A1* | 10/2011 | Winoto | B82Y 10/00 216/13 |
| 2013/0056123 | A1* | 3/2013 | Tomoi | B60C 1/0008 152/510 |
| 2013/0069001 | A1* | 3/2013 | Luo | C08L 81/02 252/299.5 |

FOREIGN PATENT DOCUMENTS

| | | |
|---|---|---|
| CN | 102115654 | 7/2011 |
| CN | 102516894 A | 6/2012 |
| EP | 2 282 622 A1 | 2/2011 |
| JP | 05-163475 | 6/1993 |
| JP | 6-145630 A | 5/1994 |
| JP | 2011-516675 | 5/2011 |
| KR | 20030059053 A | 7/2003 |

OTHER PUBLICATIONS

Notice of Allowance of corresponding Chinese application No. 201280054686.1 mailed Nov. 14, 2016; 3 pages.

* cited by examiner

STRUCTURAL ADHESIVE SHEET SPECIFICALLY FOR USE IN A MIRROR BASE OF AN AUTOMOBILE INTERIOR REAR-VIEW MIRROR AND A METHOD FOR PRODUCING THE SAME

FIELD OF THE INVENTION

The present invention relates to a structural adhesive sheet and the method for producing the same. More specifically, the present invention relates to a structural adhesive sheet specifically for use in a mirror base of an automobile interior rear-view mirror and the method for producing the same.

BACKGROUND OF THE INVENTION

Being one of the essential elements in an automobile, an automobile interior rear-view mirror is a means used for observing the interior of an automobile. An automobile interior rear-view mirror is usually affixed to the glass of a front windshield via a mirror base of the rear-view mirror. Generally, OEMs require the front windshield having the mirror base of the rear-view mirror installed thereon before they leave for delivery and sell. It is accordingly significant to select a method adaptable to the process of a windshield to mount a rear-view mirror base onto the front windshield glass of an automobile.

Currently, the most commonly used method involves the use of a structural adhesive to fix the mirror base onto the front windshield glass.

The mirror base of an automobile interior rear-view mirror is a metallic part, whereas the front windshield glass is a non-metallic part, and thus they exhibit very different chemical structure and mechanical properties. Accordingly, a structural adhesive demand of high performance requirements, and specific requirements are as follows: (1) the structural adhesive is required to have good adhesion with the surfaces of the two materials to meet the requirement for stress, and exhibits a certain degree of flexibility and toughness after cure to achieve shock absorption during the running and braking process; (2) in the process of curing, the structural adhesive is not allowed to show any displacements in order to meet the requirement for the appearance of the front windshield glass; (3) the structural adhesive is required to have good cold-resistance and heat-resistance after cure; (4) the structural adhesive is required to have good processing properties to facilitate the production and processing process; (5) the curing process of the structural adhesive should be adapted with the processing process of the automobile front windshield glass. Currently, many types of adhesives are on the market, but they still cannot satisfy the above requirements for being the structural adhesive for use in the mirror base of an automobile interior rear-view mirror. Accordingly, production of a rapidly-cured structural adhesive specifically for use in the mirror base of an automobile interior rear-view mirror has great significance.

Currently, in the manufacturing industry of automobile glass, two types of adhesive are generally used in the mirror base of an automobile glass rear-view mirror: the polyurethane structural adhesive and the 3M specialized double-side adhesive tape. (1) the polyurethane adhesive: the adhesive is cured with the moisture in the atmosphere, and the polyurethane adhesive after cure exhibits good flexibility, adhesion, cold-resistance, heat-resistance, which properties comply with the requirements for the adhesive used in the mirror base of an automobile glass rear-view mirror. However, the curing time of the polyurethane adhesive is relatively long (3~7 days), which renders the production efficiency low, and severely restricts the expansion of the capacity of the automobile glass manufacturing plant. In addition, the curing process of polyurethane adhesive is independent of the processing process of the front windshield glass, which complicates the preparation process of the front windshield glass. (2) the 3M specialized double-side adhesive tape: the curing process of the adhesive tape can be conducted simultaneously with the preparation process of the laminated windshield glass. The adhesive tape exhibits high strength after cure, and has a certain degree of toughness, which, however, is too expensive, and demands for harsh storage conditions (must be stored at a temperature of 5° C. or lower), which causes inconvenience to transport and the practical application.

A patent application (No. 201010005140.X) discloses a method for attaching the mirror base of a rear-view mirror to glass. In this patent, it is disclosed that a photo-curable glue is applied evenly onto the surface of the mirror base to be bonded, followed by subjecting it to ultraviolet irradiation to initiate the reaction of glue such that the mirror base of the rear-view mirror is bonded together with the glass, by which the curing process is made simplified, but the entire method become complicated for reason that one additional process is involved, which is unfavorable to the expansion of the capacity of the automobile glass manufacturing plant.

To sum up, it is hard for the existing adhesives to meet the requirements for being a structural adhesive used in an automobile interior rear-view mirror. Accordingly, it is important to provide a structural adhesive sheet specifically for use in the mirror base of the automobile interior rear-view mirror.

SUMMARY OF THE INVENTION

In response to the above-mentioned issues, the inventor, after in-depth research and repeated experiments, provides a structural adhesive sheet specifically for use in the mirror base of an automobile interior rear-view mirror and the method of producing the same, capable of overcoming the drawbacks of the prior art.

In one aspect, the present invention provides a structural adhesive sheet specifically for use in the mirror base of the automobile interior rear-view mirror, characterized in that: said structural adhesive sheet comprises in parts by weight of 20~100 parts of a nitrile-butadiene rubber, 10~70 parts of a partially cured polysulfide adhesive, 5~40 parts of a bisphenol A type epoxy resin, 0.1~2.5 parts of a crosslinking agent, 0.2~2.5 parts of a softening agent, 3~20 parts of a curing agent, 1~10 parts of an accelerator, 20~100 parts of an inorganic filler and 0.1~3.0 parts of a silane coupling agent.

In another embodiment of the present invention, the structural adhesive sheet specifically for use in the mirror base of an automobile interior rear-view mirror further comprises 0~60 parts by weight of a modified epoxy resin.

In another embodiment of the present invention, in the structural adhesive sheet specifically for use in the mirror base of an automobile interior rear-view mirror, said bisphenol A type epoxy resin is one or more of a bisphenol A type epoxy resin E-44, a bisphenol A type epoxy resin E-12 and a bisphenol A type epoxy resin E-51.

In another embodiment of the present invention, in the structural adhesive sheet specifically for use in the mirror base of an automobile interior rear-view mirror, said partially cured polysulfide adhesive is a curing agent-deficient two-component polysulfide adhesive.

In another embodiment of the present invention, in the structural adhesive sheet specifically for use in the mirror base of an automobile interior rear-view mirror, said modified epoxy resin is one or two of a polyurethane-modified epoxy resin and a butyronitrile-modified epoxy resin.

In another embodiment of the present invention, in the structural adhesive sheet specifically for use in the mirror base of an automobile interior rear-view mirror, said softening agent is one or two of stearic acid and glycerin.

In another embodiment of the present invention, in the structural adhesive sheet specifically for use in the mirror base of an automobile interior rear-view mirror, said curing agent is one or two of dicyandiamide, modified dicyandiamide type curing agent.

In another embodiment of the present invention, in the structural adhesive sheet specifically for use in the mirror base of an automobile interior rear-view mirror, said accelerator is one or two of an imidazole type epoxy resin accelerator and an urea type epoxy resin accelerator.

In another embodiment of the present invention, in the structural adhesive sheet specifically for use in the mirror base of an automobile interior rear-view mirror, said crosslinking agent is one or two of sulfur powder and zinc oxide.

In another embodiment of the present invention, in the structural adhesive sheet specifically for use in the mirror base of an automobile interior rear-view mirror, said inorganic filler is one or more of aluminum oxide powder, nanometer sized calcium carbonate, fumed silica and carbon black.

In another embodiment of the present invention, in the structural adhesive sheet specifically for use in the mirror base of an automobile interior rear-view mirror, said silane coupling agent is one or two of γ-glycidoxypropyl trimethoxy silane and γ-thiopropyl trimethoxysilane.

In another aspect, the present invention provides a method of producing the structural adhesive sheet specifically for use in the mirror base of an automobile interior rear-view mirror of any one of the above-mentioned embodiments, said method comprises the steps of:

(1) adding in proportions a nitrile-butadiene rubber, an epoxy resin, a crosslinking agent and a softening agent into a kneader, and subjecting them to stirring at medium speed for 50~200 min for thorough mixing, meanwhile the rubber temperature is controlled and maintained less than 80° C.;

(2) adding an inorganic filler into the kneader, and subjecting it to stirring at low speed for 50~100 min, meanwhile the rubber temperature is controlled and maintained less than 80° C.

(3) adding a curing agent, an accelerator and a silane coupling agent into the kneader, and subjecting it to stirring at low speed for 60~100 min, meanwhile the rubber temperature is controlled and maintained less than 50° C. for thorough mixing to obtain the desired structural adhesive;

(4) using a continuous extrusion film forming machine, the structural adhesive obtained in step (3) is made into a adhesive sheet having a uniform thickness and a smooth surface, which is then formed into a roll by die cutting.

In one embodiment of the present invention, in the method of producing the structural adhesive sheet, 20~100 parts of a nitrile-butadiene rubber, 10~70 parts of a partially cured polysulfide adhesive, 5~40 parts of a bisphenol A type epoxy resin, 0.1~2.5 parts of a crosslinking agent, 0.2~2.5 parts of a softening agent, 3~20 parts of a curing agent, 1~10 parts of an accelerator, 20~100 parts of an inorganic filler and 0.1~3.0 parts of a silane coupling agent are used, wherein the amount is expressed in parts by weight.

In one embodiment of the present invention, the method of producing the structural adhesive sheet further comprises adding 0~60 parts by weight of a modified epoxy resin in step (1).

In another embodiment of the present invention, in the method of producing the structural adhesive sheet, said bisphenol A type epoxy resin is one or more of a bisphenol A type epoxy resin E-44, a bisphenol A type epoxy resin E-12 and a bisphenol A type epoxy resin E-51.

In another embodiment of the present invention, in the method of producing the structural adhesive sheet, said partially cured polysulfide adhesive is a curing agent-deficient two-component polysulfide adhesive.

In another embodiment of the present invention, in the method of producing the structural adhesive sheet, said modified epoxy resin is one or two of a polyurethane-modified epoxy resin and a butyronitrile-modified epoxy resin.

In another embodiment of the present invention, in the method of producing the structural adhesive sheet, said softening agent is one or two of stearic acid and glycerin.

In another embodiment of the present invention, in the method of producing the structural adhesive sheet, said curing agent is one ore two of dicyandiamide and modified dicyandiamide type curing agent.

In another embodiment of the present invention, in the method of producing the structural adhesive sheet, said accelerator is one or two of imidazole type epoxy resin accelerator and an urea type epoxy resin accelerator.

In another embodiment of the present invention, in the method of producing the structural adhesive sheet, said crosslinking agent is one or two of sulfur powder and zinc oxide.

In another embodiment of the present invention, in the method of producing the structural adhesive sheet, said inorganic filler is one or more of aluminum oxide powder, nanometer sized calcium carbonate, fumed silica and carbon black.

In another embodiment of the present invention, in the method of producing the structural adhesive sheet, said silane coupling agent is one or two of γ-glycidoxypropyl trimethoxy silane and γ-thiopropyl trimethoxysilane.

The adhesive sheet according to the present invention is made from materials like epoxy resin, nitrile-butadiene rubber, partially cured polysulfide adhesive, curing agent, accelerator and inorganic filler by subjecting them to a compounding process and an extrusion film forming process, the thus obtained adhesive sheet has a uniform thickness, a smooth surface and excellent toughness.

In comparison with the existing polyurethane adhesive, the adhesive sheet according to the present invention has the advantage of rapid curing, and thus is capable of improving the production efficiency; in comparison with the existing 3M specialized adhesive tape, the adhesive sheet according to the present invention has the advantages of high curing strength, high temperature shear force, and lower price.

PREFERRED EMBODIMENTS OF THE PRESENT INVENTION

The preferred embodiments of the present invention will be specifically described made in reference to the following Examples. However, the examples are only provided for illustration and explanation, which cannot be construed as a limitation of the protection scope of the present application.

According to one aspect of the present invention, a structural adhesive sheet specifically for use in the mirror base of the automobile interior rear-view mirror is provided, said structural adhesive sheet comprises in parts by weight of 20~100 parts of a nitrile-butadiene rubber, 10~70 parts of a partially cured polysulfide adhesive, 5~40 parts of a bisphenol A type epoxy resin, 0.1~2.5 parts of a crosslinking agent, 0.2~2.5 parts of a softening agent, 3~20 parts of a curing agent, 1~10 parts of an accelerator, 20~100 parts of an inorganic filler, 0.1~3.0 parts of a silane coupling agent.

In the structural adhesive sheet according to the present invention, as calculated in parts by weight, 20~100 parts of said nitrile-butadiene rubber is typically used. Experiments show that a structural adhesive sheet having the desired properties cannot be produced if the amount of nitrile-butadiene rubber is not within the range of 20~100 parts. For example, nitrile-butadiene rubber-4155 manufactured by Zhenjiang Nandi Chemical Co., Ltd., Jiangsu, may be used.

In the structural adhesive sheet according to the present invention, as calculated in parts by weight, 5~40 parts of said bisphenol A type epoxy resin is typically used. Experiments show that a structural adhesive sheet having the desired properties cannot be produced if the amount of said bisphenol A type epoxy resin is not within the range of 5~40 parts. In a preferred embodiment, said bisphenol A type epoxy resin may be one or more of bisphenol A type epoxy resin E-44, a bisphenol A type epoxy resin E-12 and a bisphenol A type epoxy resin E-51, which are manufactured by Baling Petroleum & Chemical Company.

In the structural adhesive sheet according to the present invention, as calculated in parts by weight, 5~40 parts of said crosslinking agent is typically used. Experiments show that a structural adhesive sheet having the desired properties cannot be produced if the amount of said crosslinking agent is not within the range of 5~40 parts. In a preferred embodiment, said crosslinking agent may be one or two of sulfur powder and zinc oxide. Being a common chemical raw material, both sulfur powder and zinc oxide are commercially available. For example, zinc oxide manufactured and sold by Fengchuan Chemical Reagent Science And Technology Co., Ltd, Tianjin.

In the structural adhesive sheet according to the present invention, as calculated in parts by weight, 0.2~2.5 parts of said softening agent is typically used. Experiments show that a structural adhesive sheet having the desired properties cannot be produced if the amount of said softening agent is not within the range of 0.2~2.5 parts. In a preferred embodiment, said softening agent may be one or two of stearic acid and glycerin. Being a common chemical raw material, both stearic acid and glycerin are commercially available. For example, glycerin manufactured and sold by Aoke Chemical Co., LTd, Shanghai.

In the structural adhesive sheet according to the present invention, as calculated in parts by weight, 3~20 parts of said curing agent is typically used. Experiments show that a structural adhesive sheet having the desired properties cannot be produced if the amount of said curing agent is not within the range of 3~20 parts. In a preferred embodiment, said curing agent may be one or two of dicyandiamide type curing agent and a modified dicyandiamide type curing agent. Being a common chemical raw material, both dicyandiamide type curing agent and a modified dicyandiamide type curing agent are commercially available. For example, the dicyandiamide manufactured by AlzChem, Germany can be used.

In the structural adhesive sheet according to the present invention, as calculated in parts by weight, 1~10 parts of said accelerator is typically used. Experiments show that a structural adhesive sheet having the desired properties can-not be produced if the amount of said accelerator is not within the range of 1~10 parts. In a preferred embodiment, said accelerator may be one or two of an imidazole type epoxy resin accelerator and a urea type epoxy resin accelerator. Being a common chemical raw material, both an imidazole type epoxy resin accelerator and a urea type epoxy resin accelerator are commercially available. For example, the imidazole type epoxy resin accelerator manufactured by Ajinomoto Fine Chemical Corporation, Japan, and the urea type epoxy resin accelerator manufactured by AlzChem, Germany.

In the structural adhesive sheet according to the present invention, as calculated in parts by weight, 20~100 parts of said inorganic filler is typically used. Experiments show that a structural adhesive sheet having the desired properties cannot be produced if the amount of said inorganic filler is not within the range of 20~100 parts. In a preferred embodiment, said inorganic filler may be one or more of aluminum oxide powder, nanometer sized calcium carbonate, fumed silica and carbon black, which are common chemical raw material and commercially available in the market. For example, aluminum oxide powder (commonly known as "aluminum powder", particle size of 5~10 nm) manufactured by Sambao Chemical Co., Ltd., Shenzhen, and fumed silica manufactured by WACKER, Germany. It should be noted that the particle size of the particle of said inorganic filler is preferably a nano-sized particle.

In the structural adhesive sheet according to the present invention, as calculated in parts by weight, 0.1~3.0 parts of said silane coupling agent is typically used. Experiments show that a structural adhesive sheet having the desired properties cannot be produced if the amount of said silane coupling agent is not within the range of 0.1~3.0 parts. In a preferred embodiment, said silane coupling agent may be one or two of γ-glycidoxypropyl trimethoxy silane and γ-thiopropyl trimethoxysilane. Being a common chemical raw material, both γ-glycidoxypropyl trimethoxy silane and γ-thiopropyl trimethoxysilane are commercially available. For example, γ-glycidoxypropyl trimethoxy silane and γ-thiopropyl trimethoxysilane manufactured by Qufu Huarong Chemical New Materials Co., Ltd., Shandong Province.

Due to the use of a relative large proportion of an inorganic filler and a nitrile-butadiene rubber, the adhesive sheet according to the present invention has a high precision film thickness and good toughness, such that the user is allowed to optionally cut the adhesive sheet of the present invention according to the size desired for their actual uses, and achieve the purpose of saving material.

In the structural adhesive sheet according to the present invention, as calculated in parts by weight, 10~70 parts of said partially cured polysulfide adhesive is typically used. Polysulfide adhesive is also known as polysulfide sealant or polysulfide sealing agent, and typically a two-component adhesive, in which one is called component A and the other is called component B. The partially cured polysulfide adhesive used in the present invention is meant to a polysulfide adhesive in which the proportion by mass of component A and component B is A:B=20:1~30:1, namely a polysulfide adhesive in which the proportion of component A exceeds that of normally used. Such two-component polysulfide adhesive may be prepared by conventional method in the art or readily purchased in the market. For example, the two-component polysulfide adhesive MF840, manufactured by Zhengzhou Zhongyuan Applied Technology Research And Development Co., Ltd, Henan, may be used as said two-component polysulfide adhesive.

In the present invention, a partially cured polysulfide adhesive is referred to a curing agent-deficient two-component polysulfide adhesive. On account of the excellent aging resistance and impact resistance of the polysulfide adhesive, incorporation of a certain amount of polysulfide adhesive into the adhesive film can improve its aging resistance and impact resistance. In addition, in the partially cured polysulfide adhesive, there exists a large amount of mercapto groups capable of reacting with the epoxy resin in the adhesive film system under high temperature, which results in the formation of a macromolecular network structure. Further, the free sulfur present in the partially cured polysulfide adhesive can act as a vulcanizing agent for vulcanizing the nitrile-butadiene rubber, by which the compatibility of the two main systems of rubber and epoxy resin in the adhesive film can be improved, and thus further improves the heat-resistance, water-resistance and moisture-resistance of the adhesive film after cured.

In the structural adhesive sheet according to the present invention, as calculated in parts by weight, 0~60 parts, preferably 10~60 parts of said modified epoxy resin is typically used. In a preferred embodiment, said modified epoxy resin is one or two of a polyurethane-modified epoxy resin and a butyronitrile-modified epoxy resin. Being a common chemical raw material, both the polyurethane-modified epoxy resin and the butyronitrile-modified epoxy resin are commercially available. For example, butyronitrile-modified epoxy resin RDX-1413 manufactured by Shanghai Zhongsi Industry Co., Ltd.

According to another aspect of the present invention, a method for producing a structural adhesive sheet specifically for use in the mirror base of an automobile interior rear-view mirror is provided, which comprises the steps of:

(1) adding in proportions a nitrile-butadiene rubber, an epoxy resin, a crosslinking agent and a softening agent into a kneader, and subjecting them to stirring at medium speed for 50~200 min for thorough mixing, meanwhile the rubber temperature is controlled and maintained less than 80° C.;

(2) adding an inorganic filler into the kneader, and subjecting it to stirring at low speed for 50~100 min, meanwhile the rubber temperature is controlled and maintained less than 80° C.

(3) adding a curing agent, an accelerator and a silane coupling agent into the kneader, and subjecting them to stirring at low speed for 60~100 min, meanwhile the rubber temperature is controlled and maintained less than 50° C. for thorough mixing to obtain the desired structural adhesive;

(4) using a continuous extrusion film forming machine, the structural adhesive obtained in step (3) is made into a adhesive sheet having a uniform thickness and a smooth surface, which is then formed into a roll by die cutting.

In the method according to the present invention, 20~100 parts of a nitrile-butadiene rubber, 10~70 parts of a partially cured polysulfide adhesive, 5~40 parts of a bisphenol A type epoxy resin, 0.1~2.5 parts of a crosslinking agent, 0.2~2.5 parts of a softening agent, 3~20 parts of a curing agent, 1~10 parts of an accelerator, 20~100 parts of an inorganic filler and 0.1~3.0 parts of a silane coupling agent are used, wherein the amount is expressed in parts by weight. The materials employed in the method according to the present invention are specified as described previously.

In the method according to the present invention, said method further comprises adding 0~60 parts by weight, preferably 10~60 parts by weight, of a modified epoxy resin in step (1).

In the method according to the present invention, said kneader and the extrusion film forming machine are common compounding and film forming apparatus in the art. For example, a planetary mixer XJB-2.5 manufactured by Gold Galaxy Mechanical Equipment Ltd., Foshan, Guangdong Province, or a kneader of NHZ-5 type made by Jingshang kneader machinery, Rugao, Jiangsu Province, can be used. As described in their instructions for use, the low speed stirring means a stirring at a speed of revolution of 5~15 r/min, while the medium speed stirring means a stirring at a speed of revolution of 15~25 r/min, through the specification of the present application.

Experiments show that the structural adhesive sheet according to the present invention does not involve an individual process for curing, whereas curing can be occurred upon the laminated glass of the automobile front windshield is formed, which simplifies the manufacturing process of automobiles, and lowers the cost for producing automobiles.

Experiments show that the structural adhesive sheet according to the present invention exhibits high structural strength after cure, good toughness and excellent heat-resistance and cold-resistance.

It should be noted that the apparatus employed in the property test in the following Examples is the mechanical property testing apparatus CMT4304 manufactured by Shenzhen SUNS Technologies Inc.

In the method of the present invention, the rubber temperature means the temperature of the mixed components in the kneader.

Example 1

40 parts of nitrile-butadiene rubber, 20 parts of partially cured polysulfide adhesive (A:B=30:1), 35 parts of epoxy resin E-44, 20 parts of epoxy resin E-12, 0.5 parts of sulfur powder, 2.0 parts of stearic acid, 12 parts of dicyandiamide, 10 parts of aluminum oxide powder, 40 parts of nanometer sized calcium carbonate, 10 parts of fumed silica, 1.5 parts of γ-glycidoxypropyl trimethoxy silane, 4.0 parts of methylimidazole and 3.0 parts of modified urea.

Preparation steps are specified as follows: adding in proportions a nitrile-butadiene rubber, epoxy resin, a modified epoxy resin, vulcanizing agent and a softening agent into a kneader, and subjecting them to stirring at medium speed for 100 min for thorough mixing, meanwhile the rubber temperature is controlled and maintained less than 80° C.; adding an inorganic filler into the kneader, and subjecting it to stirring at low speed for 80 min, meanwhile the rubber temperature is controlled and maintained less than 80° C.; adding a curing agent, an accelerator and a silane coupling agent into the kneader, and subjecting them to stirring at low speed for 80 min, meanwhile the rubber temperature is controlled and maintained less than 50° C. for thorough mixing to obtain the desired structural adhesive; using a continuous extrusion film forming machine, the structural adhesive obtained in step (3) is made into a adhesive sheet having a uniform thickness and a smooth surface, which is then formed into a roll by die cutting, to obtain a structural adhesive sheet according to the present invention having a controllable film thickness of 0.5 mm±0.02 mm.

The thus obtained structural adhesive sheet is completely cured at 130° C. after 30 min. The testing adhesive sheet shows no sliding displacement; the shear force at standard condition measuring at a temperature of 23° C., humidity of 50% is 752N; the thermal shear force at 80° C. after 1 h is 506N, which complies with the property requirement for the shear force at standard conditions and the thermal shear force of ≥490N.

Example 2

40 parts of nitrile-butadiene rubber, 30 parts of partially cured polysulfide adhesive (A:B=20:1), 35 parts of epoxy resin E-44, 20 parts of epoxy resin E-12, 0.5 parts of sulfur powder, 2.0 parts of stearic acid, 10 parts of dicyandiamide, 10 parts of aluminum oxide powder, 40 parts of nanometer sized calcium carbonate, 10 parts of fumed silica, 1.5 parts of γ-glycidoxypropyl trimethoxy silane, 3.0 parts of methylimidazole and 2.0 parts of modified urea.

Preparation steps are specified as follows: adding in proportions a nitrile-butadiene rubber, epoxy resin, a modified epoxy resin, vulcanizing agent and a softening agent into a kneader, and subjecting them to stirring at medium speed for 100 min for thorough mixing, meanwhile the rubber temperature is controlled and maintained less than 80° C.; adding an inorganic filler into the kneader, and subjecting it to stirring at low speed for 80 min, meanwhile the rubber temperature is controlled and maintained less than 80° C.; adding a curing agent, an accelerator and a silane coupling agent into the kneader, and subjecting them to stirring at low speed for 80 min, meanwhile the rubber temperature is controlled and maintained less than 50° C. for thorough mixing to obtain the desired structural adhesive; using a continuous extrusion film forming machine, the structural adhesive obtained in step (3) is made into a adhesive sheet having a uniform thickness and a smooth surface, which is then formed into a roll by die cutting, to obtain a structural adhesive sheet according to the present invention having a controllable film thickness of 0.5 mm±0.02 mm.

The thus obtained structural adhesive sheet is completely cured at 130° C. after 30 min. The testing adhesive sheet shows no sliding displacement; the shear force at standard conditions measuring at a temperature of 23° C., humidity of 50% is 839N; the thermal shear force at 80° C. after 1 h is 563N, which complies with the property requirement for the shear force at standard conditions and the thermal shear force of ≥490N.

Example 3

50 parts of nitrile-butadiene rubber, 20 parts of partially cured polysulfide adhesive (A:B=20:1), 30 parts of epoxy resin E-44, 35 parts of butyronitrile-modified epoxy resin, 1.0 parts of sulfur powder, 2.0 parts of stearic acid, 6.0 parts of dicyandiamide, 8.0 parts of aluminum oxide powder, 38 parts of nanometer sized calcium carbonate, 9 parts of fumed silica, 1.5 parts of γ-glycidoxypropyl trimethoxy silane, 1.0 parts of zinc oxide, 4.0 parts of imidazole and 1.0 parts of modified urea.

Preparation steps are specified as follows: adding in proportions a nitrile-butadiene rubber, epoxy resin, a modified epoxy resin, vulcanizing agent and a softening agent into a kneader, and subjecting them to stirring at medium speed for 80 min for thorough mixing, meanwhile the rubber temperature is controlled and maintained less than 80° C.; adding an inorganic filler into the kneader, and subjecting it to stirring at low speed for 50 min, meanwhile the rubber temperature is controlled and maintained less than 80° C.; adding a curing agent, an accelerator and a silane coupling agent into the kneader, and subjecting them to stirring at low speed for 60 min, meanwhile the rubber temperature is controlled and maintained less than 50° C. for thorough mixing to obtain the desired structural adhesive; using a continuous extrusion film forming machine, the structural adhesive obtained in step (3) is made into a adhesive sheet having a uniform thickness and a smooth surface, which is then formed into a roll by die cutting, to obtain a structural adhesive sheet according to the present invention having a controllable film thickness of 0.5 mm±0.02 mm.

The thus obtained structural adhesive sheet is completely cured at 130° C. after 30 min. The testing adhesive sheet shows no sliding displacement; the shear force at standard conditions measuring at a temperature of 23° C., humidity of 50% is 779N; the thermal shear force at 80° C. after 1 h is 578N, which complies with the property requirement for the shear force at standard conditions and the thermal shear force of ≥490N.

Example 4

55 parts of nitrile-butadiene rubber, 20 parts of partially cured polysulfide adhesive (A:B=25:1), 40 parts of epoxy resin E-51, 40 parts of a polyurethane-modified epoxy resin, 1.5 parts of sulfur powder, 1.5 parts of stearic acid, 12 parts of dicyandiamide, 5 parts of aluminum oxide powder, 15 parts of nanometer sized calcium carbonate, 15 parts of fumed silica, 1.0 parts of γ-glycidoxypropyl trimethoxy silane, 0.5 parts of zinc oxide, 3.0 parts of thiourea and 0.5 parts of carbon black.

Preparation steps are specified as follows: adding in proportions a nitrile-butadiene rubber, epoxy resin, a modified epoxy resin, vulcanizing agent and a softening agent into a kneader, and subjecting them to stirring at medium speed for 150 min for thorough mixing, meanwhile the rubber temperature is controlled and maintained less than 80° C.; adding an inorganic filler into the kneader, and subjecting it to stirring at low speed for 90 min, meanwhile the rubber temperature is controlled and maintained less than 80° C.; adding a curing agent, an accelerator and a silane coupling agent into the kneader, and subjecting them to stirring at low speed for 100 min, meanwhile the rubber temperature is controlled and maintained less than 50° C. for thorough mixing to obtain the desired structural adhesive; using a continuous extrusion film forming machine, the structural adhesive obtained in step (3) is made into a adhesive sheet having a uniform thickness and a smooth surface, which is then formed into a roll by die cutting, to obtain a structural adhesive sheet according to the present invention having a controllable film thickness of 0.5 mm±0.02 mm.

The thus obtained structural adhesive sheet is completely cured at 130° C. after 30 min. The testing adhesive sheet shows no sliding displacement; the shear force at standard conditions measuring at a temperature of 23° C., humidity of 50% is 951N; the thermal shear force at 80° C. after 1 h is 607N, which complies with the property requirement for the shear force at standard conditions and the thermal shear force of ≥490N.

Example 5

45 parts of nitrile-butadiene rubber, 30 parts of partially cured polysulfide adhesive (A:B=25:1), 30 parts of epoxy resin E-44, 30 parts of a polyurethane-modified epoxy resin, 1.0 parts of sulfur powder, 1.5 parts of stearic acid, 10 parts of dicyandiamide, 8 parts of aluminum oxide powder, 15 parts of nanometer sized calcium carbonate, 20 parts of fumed silica, 2.5 parts of γ-glycidoxypropyl trimethoxy silane, 1.5 parts of zinc oxide, 4 parts of imidazole, 2 parts of modified urea and 1 part of carbon black.

Preparation steps are specified as follows: adding in proportions a nitrile-butadiene rubber, epoxy resin, a modified epoxy resin, vulcanizing agent and a softening agent into a kneader, and subjecting them to stirring at medium speed for 80 min for thorough mixing, meanwhile the rubber temperature is controlled and maintained less than 80° C.; adding an inorganic filler into the kneader, and subjecting it to stirring at low speed for 80 min, meanwhile the rubber temperature is controlled and maintained less than 80° C.; adding a curing agent, an accelerator and a silane coupling agent into the kneader, and subjecting them to stirring at low speed for 80 min, meanwhile the rubber temperature is controlled and maintained less than 50° C. for thorough mixing to obtain the desired structural adhesive; using a continuous extrusion film forming machine, the structural adhesive obtained in step (3) is made into a adhesive sheet having a uniform thickness and a smooth surface, which is then formed into a roll by die cutting, to obtain a structural adhesive sheet according to the present invention having a controllable film thickness of 0.5 mm±0.02 mm.

The thus obtained structural adhesive sheet is completely cured at 130° C. after 30 min. The testing adhesive sheet shows no sliding displacement; the shear force at standard conditions measuring at a temperature of 23° C., humidity of 50% is 980N; the thermal shear force at 80° C. after 1 h is 581N, which complies with the property requirement for the shear force at standard conditions and the thermal shear force of ≥490N.

Example 6

30 parts of nitrile-butadiene rubber, 50 parts of partially cured polysulfide adhesive (A:B=25:1), 70 parts of epoxy resin E-44, 1.0 parts of sulfur powder, 0.5 parts of stearic acid, 12 parts of dicyandiamide, 5 parts of aluminum oxide powder, 20 parts of nanometer sized calcium carbonate, 20 parts of fumed silica, 1.5 parts of γ-glycidoxypropyl trimethoxy silane, 2 parts of zinc oxide, 3 parts of imidazole, 2 parts of modified urea and 1 part of carbon black.

Preparation steps are specified as follows: adding in proportions a nitrile-butadiene rubber, epoxy resin, a modified epoxy resin, vulcanizing agent and a softening agent into a kneader, and subjecting them to stirring at medium speed for 100 min for thorough mixing, meanwhile the rubber temperature is controlled and maintained less than 80° C.; adding an inorganic filler into the kneader, and subjecting it to stirring at low speed for 50 min, meanwhile the rubber temperature is controlled and maintained less than 80° C.; adding a curing agent, an accelerator and a silane coupling agent into the kneader, and subjecting them to stirring at low speed for 50 min, meanwhile the rubber temperature is controlled and maintained less than 50° C. for thorough mixing to obtain the desired structural adhesive; using a continuous extrusion film forming machine, the structural adhesive obtained in step (3) is made into a adhesive sheet having a uniform thickness and a smooth surface, which is then formed into a roll by die cutting, to obtain a structural adhesive sheet according to the present invention having a controllable film thickness of 0.5 mm±0.02 mm.

The thus obtained structural adhesive sheet is completely cured at 130° C. after 30 min. The testing adhesive sheet shows no sliding displacement; the shear force at standard conditions measuring at a temperature of 23° C., humidity of 50% is 981N; the thermal shear force at 80° C. after 1 h is 659N, which complies with the property requirement for the shear force at standard conditions and the thermal shear force of ≥490N.

Comparative Example 1

Under the same conditions as in the above Examples, the existing polyurethane adhesive sheets are tested:

A polyurethane adhesive sheet is placed horizontally at a temperature of 23° C., humidity of 50% for 7 days until completely cured. The shear force at standard conditions measuring at a temperature of 23° C., humidity of 50% is 678N; the thermal shear force at 80° C. after 1 h is 504N, which complies with the property requirement for the shear force at standard conditions and the thermal shear force of ≥490N.

Comparative Example 2

Under the same conditions as in the above Examples, the existing 3M adhesive sheets are tested:

A 3M adhesive sheet is completely cured at a condition of 130° C. after 30 min. The testing adhesive sheet shows no sliding displacement; the shear force at standard conditions measuring at a temperature of 23° C., humidity of 50% is 729N; the thermal shear force at 80° C. after 1 h is 526N, which complies with the property requirement for the shear force at standard conditions and the thermal shear force of ≥490N.

The testing results of Example 1~6 and Comparative Example 1~2 are summarized in Table 1.

TABLE 1

| Example | Shear force at standard conditions | Thermal shear force |
| --- | --- | --- |
| Example 1 | 752N | 506N |
| Example 2 | 839N | 563N |
| Example 3 | 779N | 578N |
| Example 4 | 951N | 607N |
| Example 5 | 980N | 581N |
| Example 6 | 981N | 659N |
| Comparative Example 1 | 678N | 504N |
| Comparative Example 2 | 729N | 526N |

From Table 1, it is shown that both the shear force at standard condition and the thermal shear force of the structural adhesive sheet of the present invention are greater than that of the polyurethane adhesive sheet and the 3M adhesive sheet. In addition, the polyurethane adhesive sheet is placed horizontally for 7 days in order for achieving complete curing, which the curing time is too long and occupies a large area of the production workshop, and thus greatly reduces the production efficiency of the automobile glass; in comparison with the 3M adhesive sheet, the structural adhesive sheet of the present invention has a relatively high shear force at standard conditions and thermal shear force, and its price is low and is convenient for use.

Although the present invention is specifically described and illustrated made in reference to the exemplary embodiments, it should be understood that various alterations or modifications may be made therein without departing from the spirit or scope of the invention, and that all modifications or alternatives equivalent thereto are within the spirit and scope of the invention as set forth in the appended claims.

The invention claimed is:

1. A structural adhesive sheet specifically for use in the mirror base of an automobile interior rear-view mirror, wherein said structural adhesive sheet comprises in parts by weight of 20~100 parts of a nitrile-butadiene rubber, 10~70 parts of a partially cured polysulfide adhesive, 5~40 parts of a bisphenol A epoxy resin, 0.1~2.5 parts of a crosslinking agent, 0.2~2.5 parts of a softening agent, 3~20 parts of a curing agent, 1~10 parts of an accelerator, 20~100 parts of an inorganic filler, 0.1~3.0 parts of a silane coupling agent, and 0~60 parts of a modified epoxy resin, wherein said partially cured polysulfide adhesive is a curing agent-deficient two-component polysulfide adhesive.

2. The structural adhesive sheet specifically for use in the mirror base of an automobile interior rear-view mirror according to claim 1, wherein said modified epoxy resin is one or two of a polyurethane-modified epoxy resin and a butyronitrile-modified epoxy resin.

3. The structural adhesive sheet specifically for use in the mirror base of an automobile interior rear-view mirror according to claim 1, wherein said softening agent is one or two of stearic acid and glycerin.

4. The structural adhesive sheet specifically for use in the mirror base of an automobile interior rear-view mirror according to claim 1, wherein said curing agent is one or two of dicyandiamide curing agent and a modified dicyandiamide curing agent.

5. The structural adhesive sheet specifically for use in the mirror base of an automobile interior rear-view mirror according to claim 1, wherein said accelerator is one or two of an imidazole epoxy resin accelerator and a urea epoxy resin accelerator.

6. The structural adhesive sheet specifically for use in the mirror base of an automobile interior rear-view mirror according to claim 1, wherein said crosslinking agent is one or two of sulfur powder and zinc oxide.

7. The structural adhesive sheet specifically for use in the mirror base of an automobile interior rear-view mirror according to claim 1, wherein said inorganic filler is one or more of aluminum oxide powder, nanometer sized calcium carbonate, fumed silica, and carbon black.

8. The structural adhesive sheet specifically for use in the mirror base of an automobile interior rear-view mirror according to claim 1, wherein said silane coupling agent is one or two of γ-glycidoxypropyl trimethoxy silane and γ-thiopropyl trimethoxy silane.

9. A method for producing the structural adhesive sheet specifically for use in the mirror base of an automobile interior rear-view mirror according to any one of the preceding claims, which comprises the steps of:
(1) adding in proportions a nitrile-butadiene rubber, an epoxy resin, a crosslinking agent and a softening agent into a kneader, and subjecting them to stirring at medium speed for 50~200 min for thorough mixing, meanwhile the rubber temperature is controlled and maintained less than 80° C.;
(2) adding an inorganic filler into the kneader, and subjecting it to stirring at low speed for 50~100 min, meanwhile the rubber temperature is controlled and maintained less than 80° C.;
(3) adding a curing agent, an accelerator and a silane coupling agent into the kneader, and subjecting them to stirring at low speed for 60~100 min, meanwhile the rubber temperature is controlled and maintained less than 50° C. for thorough mixing to obtain the desired structural adhesive; and
(4) using a continuous extrusion film forming machine, the structural adhesive obtained in step (3) is made into a adhesive sheet having a uniform thickness and a smooth surface, which is then formed into a roll by die cutting.

10. The method according to claim 9, wherein 20~100 parts of a nitrile-butadiene rubber, 10~70 parts of a partially cured polysulfide adhesive, 5~40 parts of a bisphenol A epoxy resin, 0.1~2.5 parts of a crosslinking agent, 0.2~2.5 parts of a softening agent, 3~20 parts of a curing agent, 1~10 parts of an accelerator, 20~100 parts of an inorganic filler and 0.1~3.0 parts of a silane coupling agent are used in said method, and the amount is expressed in parts by weight.

11. The method according to claim 9, which further comprises adding 0~60 parts by weight of a modified epoxy resin in step (1).

* * * * *